US012769726B2

(12) United States Patent
Zhou et al.

(10) Patent No.: US 12,769,726 B2
(45) Date of Patent: Oct. 20, 2026

(54) STRUCTURED QUERY LANGUAGE STATEMENT VALIDATION BASED ON MACHINE LEARNING

(71) Applicant: International Business Machines Corporation, Armonk, NY (US)

(72) Inventors: Qi Liang Zhou, Xi'An (CN); Rui Han, Xi'An (CN); Yuan Yuan Ding, Shanghai (CN); Huan Da Wang, Beijing (CN); Qiu Ming Zhu, Yangpu (CN); Ya Juan Dang, Beijing (CN); Ying Wei, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/935,603

(22) Filed: Nov. 3, 2024

(65) Prior Publication Data

US 2026/0127163 A1 May 7, 2026

(51) Int. Cl.
*G06F 16/242* (2019.01)
*G06F 16/21* (2019.01)
*G06F 16/23* (2019.01)

(52) U.S. Cl.
CPC .......... *G06F 16/243* (2019.01); *G06F 16/212* (2019.01); *G06F 16/2365* (2019.01)

(58) Field of Classification Search
CPC .. G06F 16/243; G06F 16/212; G06F 16/2365; G06F 40/20; G06F 16/3329; G06F 16/24522; G06N 5/022
See application file for complete search history.

(56) References Cited

U.S. PATENT DOCUMENTS

| | | | | |
|---|---|---|---|---|
| 9,971,595 | B1 * | 5/2018 | Thompson | G06F 8/71 |
| 10,229,158 | B2 | 3/2019 | Belknap et al. | |
| 12,353,469 | B1 * | 7/2025 | Mahabadi | G06F 16/332 |
| 12,430,333 | B2 * | 9/2025 | Jain | G06F 16/24542 |
| 2010/0005340 | A1 * | 1/2010 | Belknap | G06F 11/3688 714/37 |
| 2014/0115007 | A1 * | 4/2014 | Harvey | H04L 41/50 707/796 |
| 2018/0336198 | A1 * | 11/2018 | Zhong | G06F 16/24522 |
| 2018/0365134 | A1 * | 12/2018 | Devpura | G06F 11/3688 |
| 2022/0121656 | A1 * | 4/2022 | Zheng | G06F 18/24133 |

(Continued)

FOREIGN PATENT DOCUMENTS

| | | |
|---|---|---|
| CN | 105518676 B | 12/2010 |
| CN | 111813802 B | 6/2021 |

(Continued)

*Primary Examiner* — Dennis Truong
(74) *Attorney, Agent, or Firm* — Harrity & Harrity, LLP

(57) ABSTRACT

An example operation may include one or more of receiving a natural language input, executing a generative machine learning (ML) model on the natural language input to generate a structured query language (SQL) statement, executing the SQL statement on fake mockup data to generate a first query result on the fake mockup data, executing the generative ML model on the natural language input and the fake mockup data to generate a second query result on the fake mockup data, and determining whether the SQL statement is valid based on a comparison of the first query result and the second query result.

20 Claims, 11 Drawing Sheets

(56) References Cited

U.S. PATENT DOCUMENTS

| | | | | |
|---|---|---|---|---|
| 2023/0177052 | A1* | 6/2023 | Li | G06F 16/24524 707/713 |
| 2023/0334071 | A1* | 10/2023 | Whitehead, Jr. | G06F 16/22 |
| 2025/0077517 | A1* | 3/2025 | Popescu | G06F 16/24522 |

FOREIGN PATENT DOCUMENTS

| | | | | | |
|---|---|---|---|---|---|
| CN | 110945495 | B | | 4/2022 | |
| CN | 117493379 | A | | 2/2024 | |
| CN | 117591537 | A | * | 2/2024 | G06F 16/2433 |
| CN | 118051594 | A | | 5/2024 | |
| CN | 118277588 | A | * | 7/2024 | G06N 3/045 |
| CN | 118585537 | A | * | 9/2024 | G06F 40/186 |
| CN | 119248813 | A | * | 1/2025 | G06F 16/2453 |
| WO | WO-2021108313 | A1 | * | 6/2021 | G06F 16/24522 |

* cited by examiner

200

300A

300B

| Material Code | Create Date | Quantity | Order ID | Month | ... |
|---|---|---|---|---|---|
| A | 1-15-23 | 1000 | 1001 | 2-23 | ... |
| B | 1-20-23 | 500 | 1002 | 3-23 | |
| C | 2-05-23 | 2000 | 1003 | 3-23 | ... |
| A | 2-10-23 | 1500 | 1004 | 4-23 | |
| B | 3-05-23 | 750 | 1005 | 4-23 | ... |
| C | 3-11-23 | 3000 | 1006 | 5-23 | |

300C

300D

300E

300F

1st Case 400

(Success)

| Material Code | Quantity | Month |
|---|---|---|
| A | 1000 | 2-23 |
| B | 500 | 3-23 |
| C | 2000 | 3-23 |
| A | 1500 | 4-23 |
| B | 750 | 4-23 |
| C | 3000 | 5-23 |

1st Query Result

| Material Code | Quantity | Month |
|---|---|---|
| A | 1000 | 2-23 |
| B | 500 | 3-23 |
| C | 2000 | 3-23 |
| A | 1500 | 4-23 |
| B | 750 | 4-23 |
| C | 3000 | 5-23 |

2nd Query Result

FIG. 4A

2nd Case 410

(Success)

| Mat. Code | Quan. | Month | Mat. Key |
|---|---|---|---|
| A | 1000 | 2-23 | 1 |
| B | 500 | 3-23 | 2 |
| C | 2000 | 3-23 | 3 |
| A | 1500 | 4-23 | 1 |
| B | 750 | 4-23 | 2 |
| C | 3000 | 5-23 | 3 |

1st Query Result

| Material Code | Quantity | Month |
|---|---|---|
| A | 1000 | 2-23 |
| B | 500 | 3-23 |
| C | 2000 | 3-23 |
| A | 1500 | 4-23 |
| B | 750 | 4-23 |
| C | 3000 | 5-23 |

2nd Query Result

FIG. 4B

3rd Case 420

(Fail)

| Material Code | Quantity | Month |
|---|---|---|
| B | 500 | 3-23 |
| C | 2000 | 3-23 |
| B | 750 | 4-23 |
| C | 3000 | 5-23 |

1st Query Result

| Material Code | Quantity | Month |
|---|---|---|
| A | 1000 | 2-23 |
| B | 500 | 3-23 |
| C | 2000 | 3-23 |
| A | 1500 | 4-23 |
| B | 750 | 4-23 |
| C | 3000 | 5-23 |

2nd Query Result

FIG. 4C

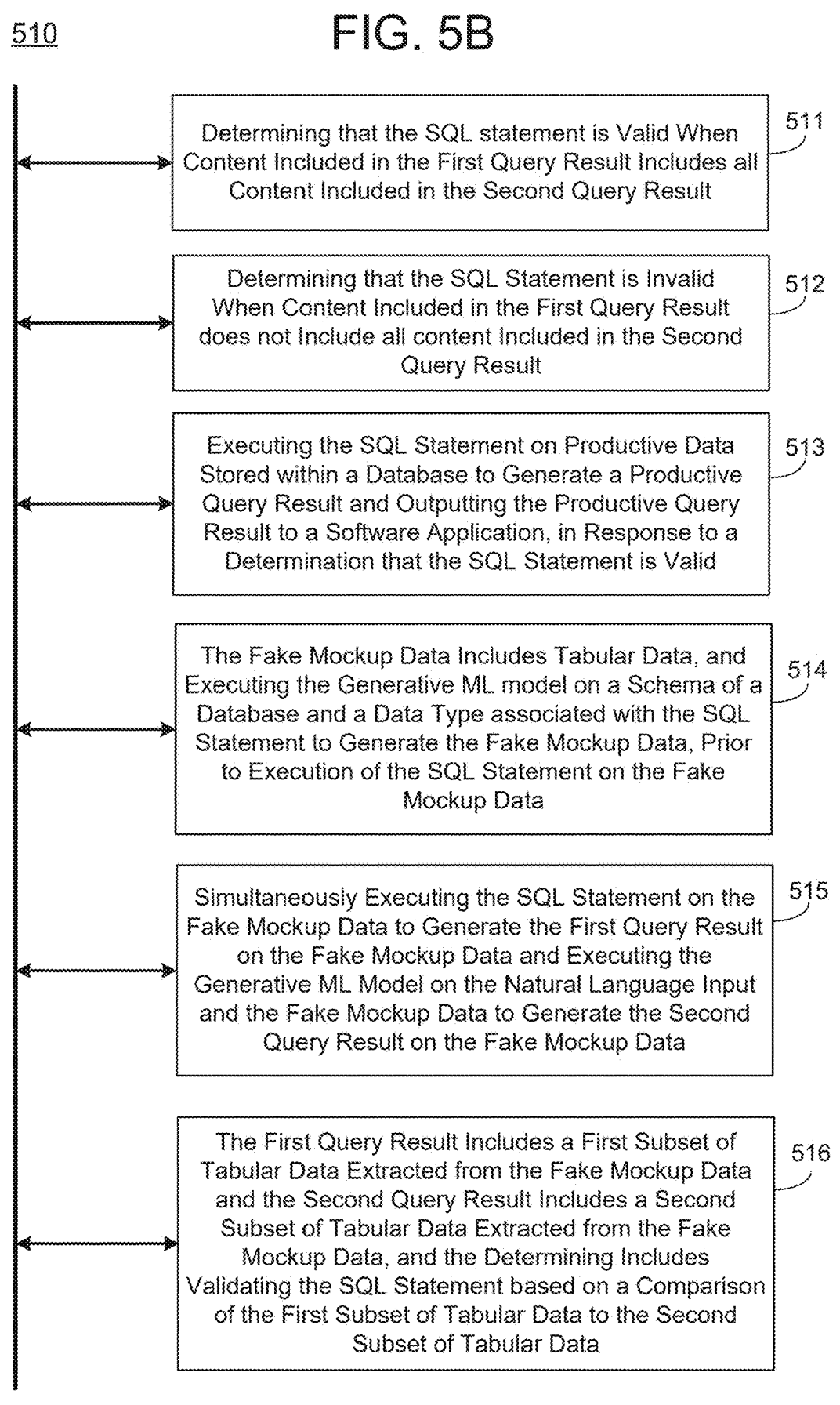

510

FIG. 5B

Determining that the SQL statement is Valid When Content Included in the First Query Result Includes all Content Included in the Second Query Result — 511

Determining that the SQL Statement is Invalid When Content Included in the First Query Result does not Include all content Included in the Second Query Result — 512

Executing the SQL Statement on Productive Data Stored within a Database to Generate a Productive Query Result and Outputting the Productive Query Result to a Software Application, in Response to a Determination that the SQL Statement is Valid — 513

The Fake Mockup Data Includes Tabular Data, and Executing the Generative ML model on a Schema of a Database and a Data Type associated with the SQL Statement to Generate the Fake Mockup Data, Prior to Execution of the SQL Statement on the Fake Mockup Data — 514

Simultaneously Executing the SQL Statement on the Fake Mockup Data to Generate the First Query Result on the Fake Mockup Data and Executing the Generative ML Model on the Natural Language Input and the Fake Mockup Data to Generate the Second Query Result on the Fake Mockup Data — 515

The First Query Result Includes a First Subset of Tabular Data Extracted from the Fake Mockup Data and the Second Query Result Includes a Second Subset of Tabular Data Extracted from the Fake Mockup Data, and the Determining Includes Validating the SQL Statement based on a Comparison of the First Subset of Tabular Data to the Second Subset of Tabular Data — 516

STRUCTURED QUERY LANGUAGE STATEMENT VALIDATION BASED ON MACHINE LEARNING

BACKGROUND

One of the most common mechanisms for accessing large amounts of structured data, such as tabular data, is through structured query language (SQL) commands. Recently, machine learning has been used to generate an executable SQL command using generative capability, and then, subsequently, this SQL command is employed to fetch data from the database. However, SQL commands generated by machine learning models are not completely accurate and often require manual work to verify the accuracy of the SQL commands. In addition, it is difficult for non-expert users to tell whether the generated SQL commands are accurate.

SUMMARY

One example embodiment provides an apparatus that includes a memory, and at least one processor communicatively coupled to the memory, the at least one processor may perform one or more of receive a natural language input, execute a generative machine learning (ML) model on the natural language input to generate a structured query language (SQL) statement, execute the SQL statement on fake mockup data to generate a first query result on the fake mockup data, execute the generative ML model on the natural language input and the fake mockup data to generate a second query result on the fake mockup data, and determine whether the SQL statement is valid based on a comparison of the first query result and the second query result.

Another example embodiments provides a method that may include one or more of receiving a natural language input, executing a generative machine learning (ML) model on the natural language input to generate a structured query language (SQL) statement, executing the SQL statement on fake mockup data to generate a first query result on the fake mockup data, executing the generative ML model on the natural language input and the fake mockup data to generate a second query result on the fake mockup data, and determining whether the SQL statement is valid based on a comparison of the first query result and the second query result.

A further example embodiment provides a computer-readable storage medium with instructions which when executed by a processor cause the processor to perform one or more of receiving a natural language input, executing a generative machine learning (ML) model on the natural language input to generate a structured query language (SQL) statement, executing the SQL statement on fake mockup data to generate a first query result on the fake mockup data, executing the generative ML model on the natural language input and the fake mockup data to generate a second query result on the fake mockup data, and determining whether the SQL statement is valid based on a comparison of the first query result and the second query result.

BRIEF DESCRIPTION OF THE DRAWINGS

FIGS. 4A-4C are diagrams illustrating different examples of verification results according to the examples and features of the instant solution.

FIG. 5B is a diagram illustrating a flow diagram, according to example embodiments.

DETAILED DESCRIPTION

Figure 1:
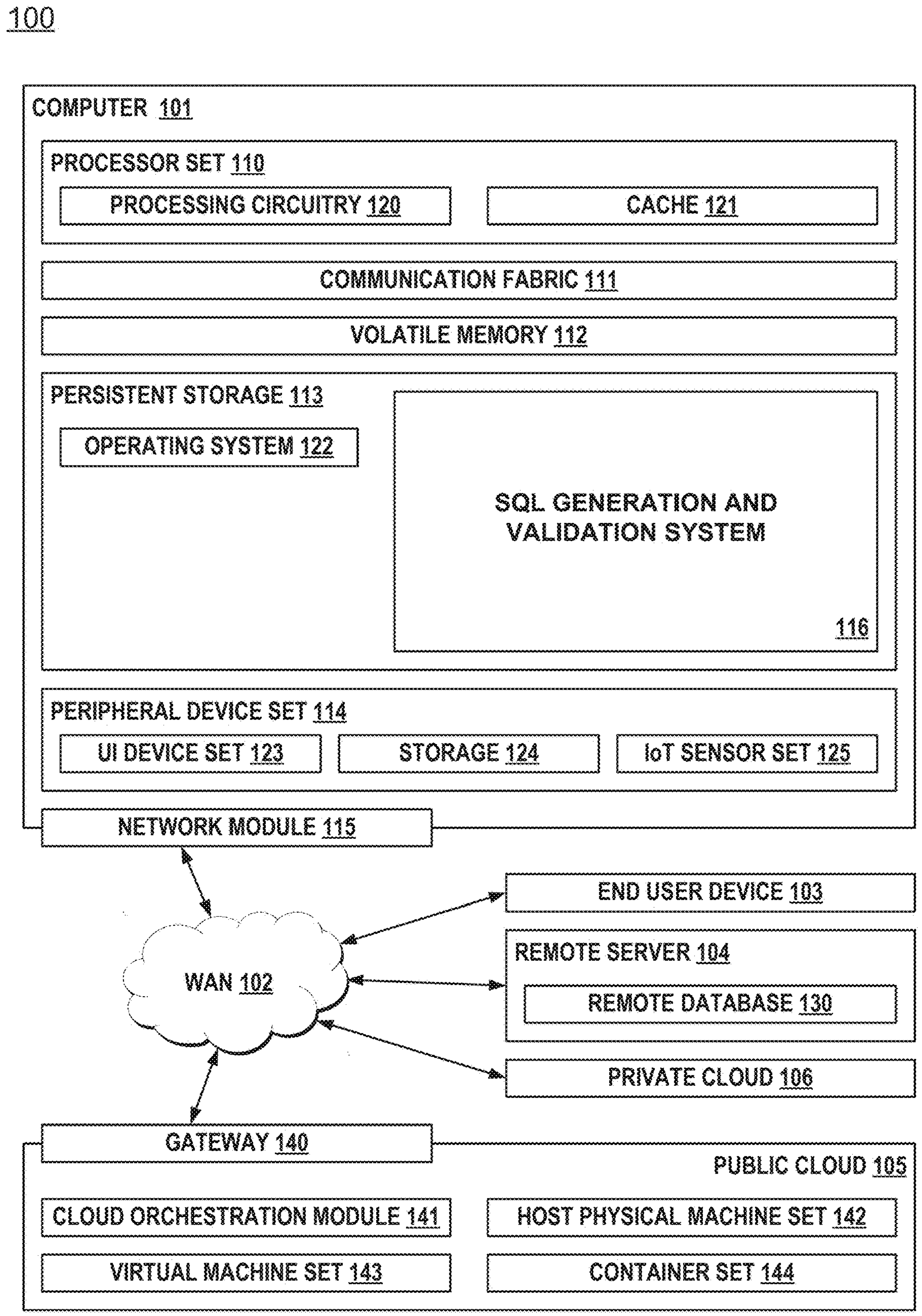
FIG. 1 is a diagram illustrating a computing environment according to an embodiment of the instant solution.

It is to be understood that although this disclosure includes a detailed description of cloud computing, implementation of the teachings recited herein is not limited to a cloud computing environment. Rather, embodiments of the instant solution can be implemented in conjunction with any other type of computing environment now known or later developed.

The example embodiments are directed to an evaluation system that automatically validates the accuracy of an SQL statement generated with a machine learning model, such as a large language model (LLM) with generative capabilities. The system can evaluate the effectiveness of SQL generation in real-time, online, and automatically. The system may include a software application with multiple different modules that can perform different steps of the evaluation process.

For example, a first module of the software application may execute a generative machine learning (ML) model to generate an SQL statement. Here, the first module may receive a natural language input from a user device. The natural language input may include a human-readable description typed into a user interface or spoken into a microphone and identifying data of interest. The generative ML model may receive the natural language input and a table schema of a database and generate an SQL statement (e.g., a query, etc.) to retrieve the data of interest from the database.

A second module of the software application may generate fake mockup data to test the accuracy of the SQL statement. As will be appreciated, live/productive data is subjected to privacy requirements, regulations, confidentiality, and the like and must be limited in its use. Therefore, such live/productive data cannot be used for machine learning training, testing, or the like. To overcome these issues with the live/productive data, the example embodiments generate fake mockup data (which resembles the live/productive data but is not subjected to privacy requirements, regulations, confidentially, and the like). As such, the fake mockup data can be used to test the accuracy of the SQL statement. The fake mockup data may be generated based on execution of the generative ML model by the second module. The execution may include a schema of the database.

A third module of the software application may query the fake mockup data with the generated SQL statement to generate a first query result. The first query result may include tabular data extracted from the fake mockup data corresponding to the SQL query. Using the generative ML model, a fourth software application module may query the fake mockup data. For example, the fourth module may input the natural language input and the fake mockup data to the generative ML model (e.g., via a prompt) and execute the generative ML model on the prompt to generate a second query result.

The system may compare the first and second query results to determine if the SQL statement is accurate. For example, the system may assume that the second query result generated by the generative ML model is accurate and may determine whether the first query result is accurate by comparing it to the second query result. If the first query result includes all of the data of the second query result, the system may determine that the SQL statement is closely accurate. In this case, the verified SQL statement may be executed on live/productive data, performing the original query requested by the natural language input. However, if the first query result does not include all the data from the second query result, the system may determine that the SQL statement is inaccurate and may not execute the SQL statement on productive data. Instead, the system may send an error notification to the software application's graphical user interface (GIU), which requests the user to enter a different natural language input.

According to various embodiments, the SQL statement (or command) can be automatically generated according to user queries, and mockup data can be used to compare the correctness of query results. An automatic and unsupervised correction of the SQL statement can occur, saving staffing and material resources and helping users and/or systems confirm the accuracy of results.

In the example embodiments, the generative machine learning model (e.g., LLM) is better for getting answers from documents. However, private documents have confidential restrictions that cannot be used with publicly available pre-trained machine learning models. Further, these documents and associated data are often sizeable, and if directly fed into the generative machine learning model, it can cause a token overflow problem. In this context, the instant system can mockup fake data according to the table schema information of the database and can control the size of the mockup of fake data, resolving the token and dataset confidentiality limitations.

The system for generating and evaluating the accuracy of an SQL statement that is described herein may be implemented within a software application, a service, or the like, which may be hosted by a host platform such as a cloud platform, a web server, a database, or the like.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for the provider and consumer of the utilized service.

Service Models are as follows:

Software as a Service (Saas): the consumer can use the provider's applications on a cloud infrastructure. The applications are accessible from various client devices through a thin client interface such as a web browser (e.g., web-based e-mail). The consumer does not manage or control the underlying cloud infrastructure, including network, servers, operating systems, storage, or individual application capabilities, except for limited user-specific application configuration settings.

Platform as a Service (PaaS): the capability provided to the consumer to deploy consumer-created or acquired applications onto the cloud infrastructure using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. The organization or a third party may manage it, and it may exist on-premises or off-premises.

Community cloud: the cloud infrastructure is shared by several organizations and supports a specific community with shared concerns (e.g., mission, security requirements, policy, and compliance considerations). Organizations or a third party may manage it, and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A service-oriented cloud computing environment focuses on statelessness, low coupling, modularity, and semantic interoperability. At the heart of cloud computing is an infrastructure that includes a network of interconnected nodes.

The instant features, structures, or characteristics described in this specification may be combined or removed in any suitable manner in one or more embodiments. For example, the usage of the phrases "example embodiments," "some embodiments," or other similar language throughout this specification refers to the fact that a particular feature, structure, or characteristic described in connection with the embodiment may be included in at least one embodiment. Thus, appearances of the phrases "example embodiments," "in some embodiments," "in other embodiments," or other similar language throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication, even if the depicted connection is a one-way or two-way arrow. Also, any device depicted in the drawings can be a different device. For example, if a mobile device is shown sending information, a wired device could also be used to send the information.

FIG. 1 illustrates a computing environment 100 according to an embodiment of the instant solution. Various aspects of the present disclosure are described by narrative text, flowcharts, block diagrams of computer systems, and/or block diagrams of the machine logic included in computer program product (CPP) embodiments. Concerning any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more, storage devices that collectively include machine readable code corresponding to instructions and/or data for performing computer operations specified in a given CPP claim. A "storage device" is any tangible device that can retain and store instructions by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the preceding. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the preceding. As that term is used in the present disclosure, a computer-readable storage medium cannot be construed as storage in the form of transitory signals. As will be understood by those of skill in the art, data is typically moved at some occasional points in time during normal operations of a storage device, such as during access, de-fragmentation, or garbage collection, but this does not render the storage device as transitory because the data is not transitory while it is stored.

Referring to FIG. 1, computing environment 100 contains an example of an environment for executing at least some of the computer code involved in performing the inventive methods, such as SQL generation and validation system 116. In addition to block 116, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 116, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or cores. Cache 121 is a memory located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off-chip." In some computing environments, processor set 110 may be designed to work with qubits and perform quantum computing.

Computer readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various computer-readable storage media, such as cache 121 and the other storage media discussed below. The program instructions and associated data are accessed by processor set 110 to control and direct the performance of the inventive methods. In computing environment 100, at least some of the instructions for performing the inventive methods may be stored in block 116 in persistent storage 113.

COMMUNICATION FABRIC 111 is the signal conduction path that allows the various components of computer 101 to communicate with each other. Typically, this fabric comprises switches and electrically conductive paths, such as the switches and electrically conductive paths that make up buses, bridges, physical input/output ports, and the like. Other signal communication paths, such as fiber optic and/or wireless, may be used.

VOLATILE MEMORY 112 is any type of volatile memory now known or to be developed in the future. Examples include dynamic random access memory (RAM) or static-type RAM. Typically, the volatile memory is characterized by random access, but this is not required unless affirmatively indicated. In computer 101, the volatile memory 112 is located in a single package and is internal to computer 101, but alternatively or additionally, the volatile memory may be distributed over multiple packages and/or located externally concerning computer 101.

PERSISTENT STORAGE 113 is any form of non-volatile computer storage that is now known or will be developed in the future. The non-volatility of this storage means that the stored data is maintained regardless of whether power is supplied to computer 101 and/or directly to persistent storage 113. Persistent storage 113 may be a read-only memory (ROM), but typically, at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 116 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth® connections, Near-Field Communication (NFC) connections, connections made by cables (such as universal serial bus (USB) type cables), insertion type connections (for example, secure digital (SD) card), connections made through local area communication networks and even connections made through wide area networks such as the Internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), then this storage may be provided by peripheral storage devices designed for storing very large amounts of data, such as a storage area network (SAN) that is shared by multiple, geographically distributed computers. IoT sensor set 125 comprises sensors that can be used in Internet of Things applications. For example, one sensor may be a thermometer, and another sensor may be a motion detector.

NETWORK MODULE 115 collects computer software, hardware, and firmware that allows computer 101 to communicate with other computers through WAN 102. Network module 115 may include hardware, such as modems or Wi-Fi® signal transceivers, software for packetizing and/or de-packetizing data for communication network transmission, and/or web browser software for communicating data over the Internet. In some embodiments, network control functions and network forwarding functions of network module 115 are performed on the same physical hardware device. In other embodiments (for example, that utilize software-defined networking (SDN)), the control and forwarding functions of network module 115 are performed on physically separate devices, such that the control functions manage several different network hardware devices. Computer-readable program instructions for performing inventive methods can typically be downloaded to computer 101 from an external computer or external storage device through a network adapter card or network interface, which is included in network module 115.

WAN 102 is any wide area network (for example, the Internet) capable of communicating computer data over non-local distances by any technology that is now known or to be developed. In some embodiments, the WAN may be replaced and/or supplemented by local area networks (LANs) designed to communicate data between devices in a local area, such as a Wi-Fi® network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system used and controlled by an end user (for example, a customer of an enterprise operating computer 101) and may take any forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display or otherwise present the recommendation to an end user. In some embodiments, EUD 103 may be a client device, such as thin client, heavy client, mainframe computer, desktop computer, etc.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers, making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and transferred among and between the various physical machine hosts, either as images or after the instantiation of the VCE. Cloud orchestration module 141 manages the transfer and storage of images, deploys new instantiations of VCEs, and manages active instantiations of VCE deployments. Gateway 140 collects computer software, hardware, and firmware, allowing public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances called containers. These isolated user-space instances typically behave like real computers from the point of view of the programs running in them. A computer program running on an ordinary operating system can utilize all of that computer's resources, such as connected devices, files and folders, network shares, CPU power, and quantifiable hardware capabilities. However, programs running inside a container can only use the contents of the container and devices assigned to the container, a feature known as containerization.

PRIVATE CLOUD 106 is similar to public cloud 105, except that the computing resources are only available for a single enterprise. While private cloud 106 is depicted as communicating with WAN 102, in other embodiments, a private cloud may be disconnected from the Internet entirely and only accessible through a local/private network. A hybrid cloud is composed of multiple clouds of different types (for example, private, community, or public cloud types), often implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 2:
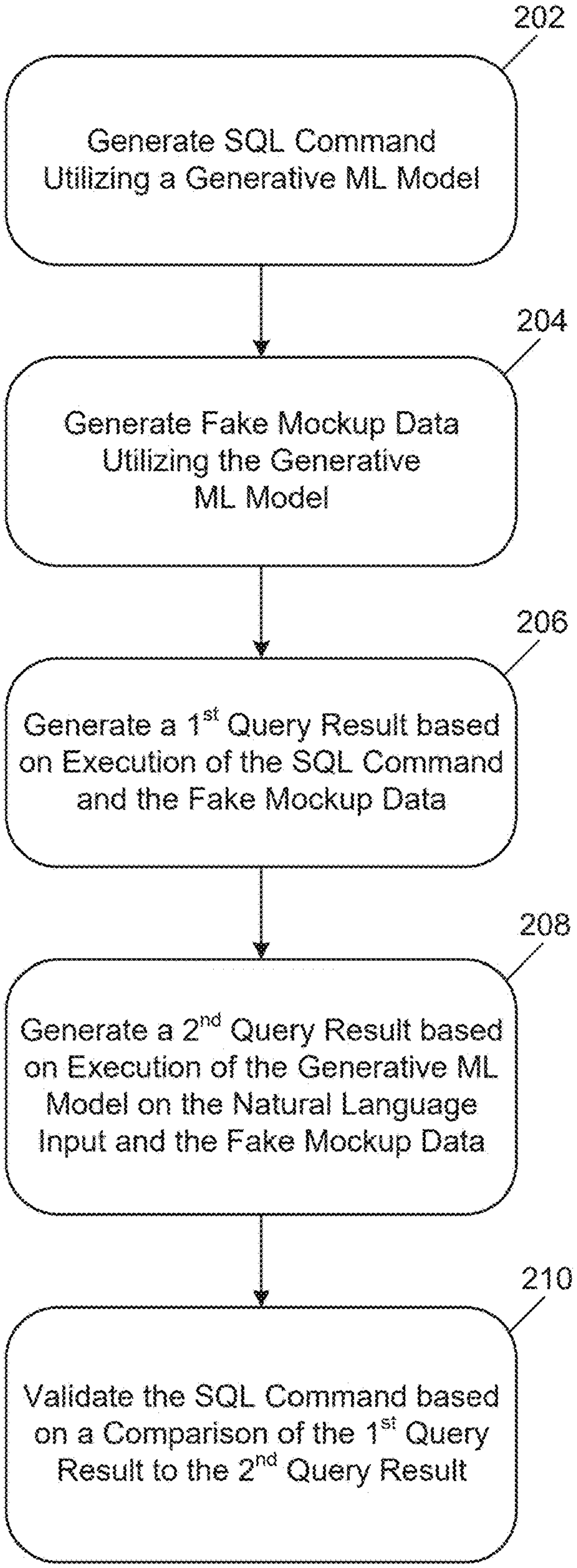
FIG. 2 is a diagram illustrating a process of generating and evaluating the accuracy of an SQL query statement according to the examples and features of the instant solution.

FIG. 2 illustrates a process 200 of generating and evaluating an SQL statement's accuracy according to the instant solution's examples and features. For example, the process 200 shown and described in FIG. 2 may be performed by a software application with multiple code modules capable of performing each step. Referring to FIG. 2, in step 202, the process may include executing an ML model on a natural language input to generate an SQL statement. The natural language input may include a human-typed or human-spoken description of data that the user would like extracted/shown.

In step 204, the process may include generating fake mockup data for use in testing the accuracy of the SQL command. As noted herein, productive data may be subjected to privacy requirements, regulations, confidentiality, and the like and therefore limited in its use. To overcome these issues with the productive data, the example embodiments generate fake mockup data that resembles the real productive data but is not subjected to privacy requirements, regulations, confidentiality, etc. Here, the fake mockup data can be generated by inputting a prompt to the ML model, which includes a table schema of the database of the productive data and the fake mockup data. In some embodiments, the prompt may also include a limitation that specifies how many rows, columns, etc. of data to be included in the fake mockup data. This enables the system to limit the size of the fake mockup data and prevent issues, such as a token overflow problem.

In step 206, the system may query the fake mockup data with the generated SQL command to generate a first query result. The first query result may include tabular data (e.g., a subset of data) extracted from the fake mockup data based on the statements in the SQL command. In step 208, the system may query the fake mockup data using the generative ML model. For example, the system may input a prompt to the ML model, which includes the natural language input and the fake mockup data to generate a second query result. It should be appreciated that steps 206 and 208 may be performed simultaneously. As another example, steps 206 and 208 may be performed in sequence, with either step 206 or 208 performed first.

In step 210, the system may validate the accuracy of the SQL command generated by the ML model in step 202. The system may compare the first and second query results to determine if the SQL command is accurate. For example, the system may assume that the second query result generated by the ML model is accurate and may determine whether the SQL command is accurate by comparing the first query result (the result of executing the SQL command) to the second query result. If the first query result includes all the data of the second query result, the system may determine that the SQL statement is accurate enough. In this case, the verified SQL statement may be executed on live/productive data, performing the original query requested by the natural language input. However, if the first query result does not include all the data from the second query result, the system may determine that the SQL statement is inaccurate and may not execute the SQL statement on productive data. Instead, the system may send an error notification to a graphical user interface of the software application, which requests the user (or a system) to enter a different natural language input.

Figure 3A:
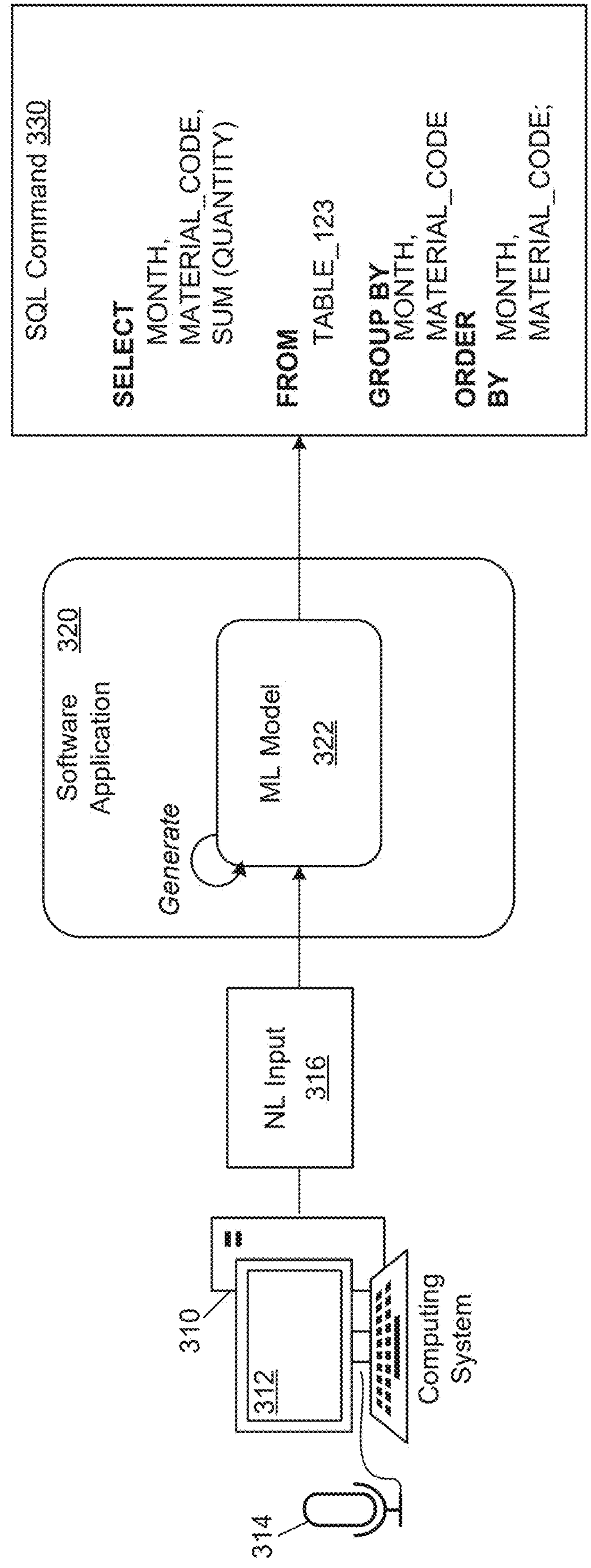
FIG. 3A is a diagram illustrating a process of generating an SQL command using a generative ML model according to the examples and features of the instant solution.

FIG. 3A illustrates a process 300A of generating an SQL command 330 using an ML model 322 according to the examples and features of the instant solution. Referring to FIG. 3A, a host system such as a software application 320 may host the ML model 322. In this example, the ML model 322 may be pre-trained and capable of performing numerous tasks, including generating SQL commands, mockup data, query results, etc. For example, the ML model 322 may be refined (or fine-tuned) through an additional training process that includes executing the ML model 322 on additional examples of SQL commands and natural language input pairs, SQL commands and query results, and the like.

In one example, a user may enter a natural language input 316 to the software application 320 through a computing system 310. The software application 320 may be hosted by a host platform (not shown), which the computing system 310 can connect with over a network such as the Internet. The software application 320 may also include a progressive web application (PWA) that can be accessed through a web browser installed on the computing system 310 by inputting a URL of the PWA into the web browser. The computing system 310 may include a mobile device that may download and access the software application 320 from a marketplace or the like.

Figure 3B:
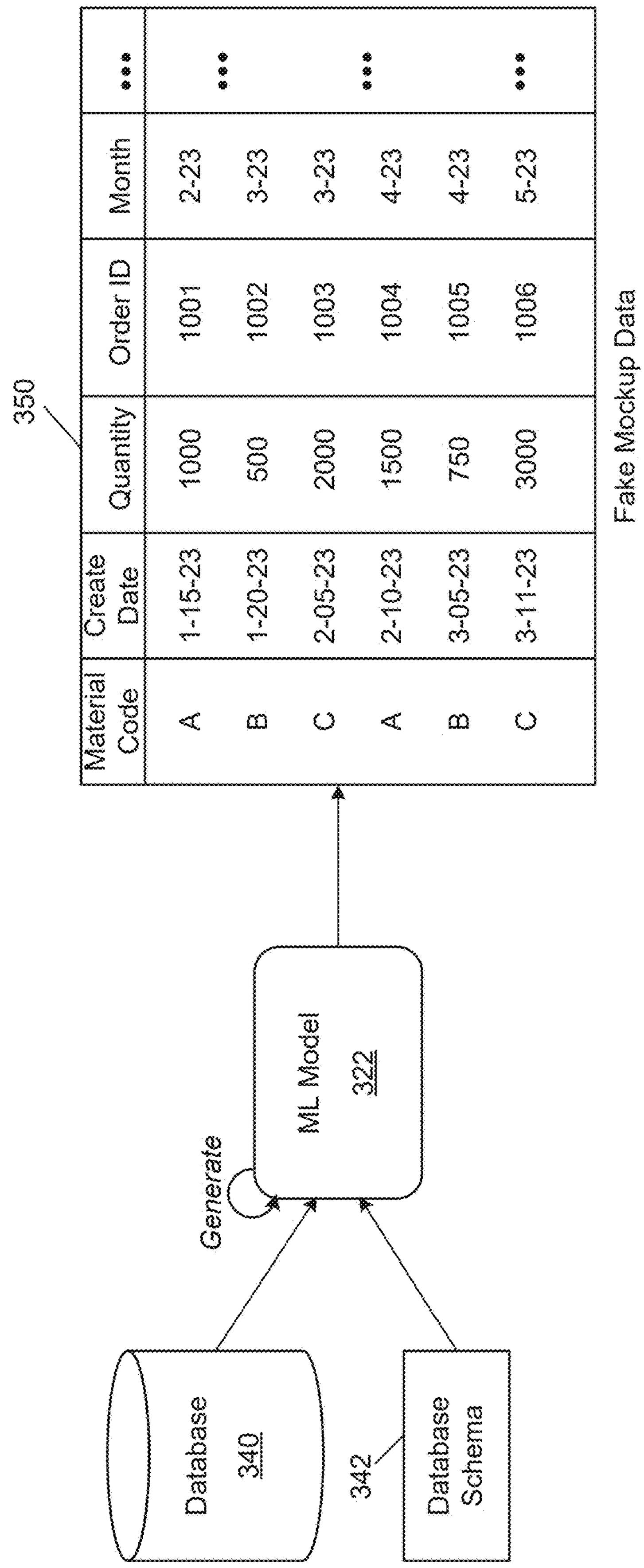
FIG. 3B is a diagram illustrating a process of generating fake mockup data according to the examples and features of the instant solution.

The computing system 310 includes a display device 312 permitting a user to enter content such as text that can be used to generate the natural language input 316 and submit the natural language input 316 to the software application 320. The computing system 310 may include a microphone 314 that may capture audio input from the user and generate natural language input 316. The computing system 310 may submit the natural language input 316 to the software application 320. The natural language input may include a request for data from a database (such as database 340), as shown in FIG. 3B. In response, the software application 320 may generate a SQL command 330, which includes statements for retrieving the requested data from the database.

The SQL command 330 may include a SELECT clause, which identifies variables/columns of data; a FROM clause, which identifies one or more tables of data from which to obtain the data; a GROUP BY clause, which is used to group rows of data in a table based on matching values in one or more columns, an ORDER BY clause which sorts results in a specified column by ascending or descending order, and the like.

FIG. 3B illustrates a process 300B of generating fake mockup data according to the examples and features of the instant solution. Referring to FIG. 3B, the software application 320 may cause the ML model 322 to ingest a prompt which includes a data type of the data in the SQL command 330, a business explanation of the data requested, a database schema 342 of the database 340, a data format, and the like. In response, the ML model 322 may generate fake mockup data 350, which resembles the data in database 340, including database schema 342, format, and data types. The ML model 322 may ingest the prompt and create a table or tables of data (fake mockup data 350) that resembles a table or tables in the database 340, but with fake data that is not subjected to privacy requirements, regulations requirements, confidentiality requirements, and the like.

The fake mockup data 350 may include columns, rows, and the like, resembling database 340. In addition, the fake mockup data 350 may be restricted in size, such that fake mockup data 350 can be inputted into the ML model 322 and executed efficiently.

Figure 3C:
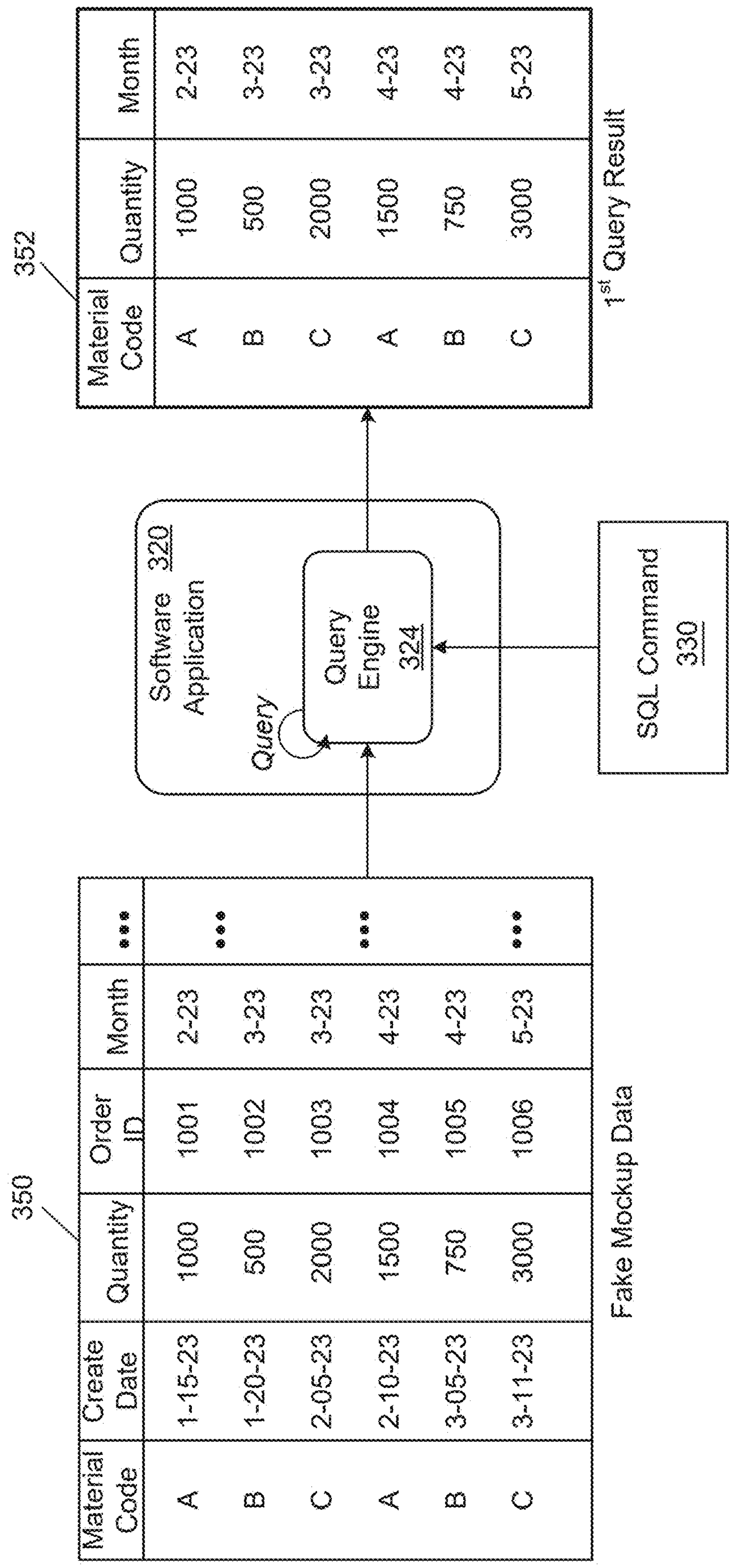
FIG. 3C is a diagram illustrating a process of querying the fake mockup data based on the SQL command to generate a first query result according to the examples and features of the instant solution.

FIG. 3C illustrates a process 300C of querying the fake mockup data 350 based on the SQL command 330 to generate a first query result 352 according to the examples and features of the instant solution. Referring to FIG. 3C, the software application 320 may include a query engine 324, which can query the fake mockup data 350 based on the SQL command 330. For example, the query engine 324 may interpret the instructions within the SQL command 330 and retrieve a subset of data (e.g., tabular data) from the fake mockup data 350 based on the instructions within the SQL command 330 to generate the first query result 352. In this example, the query engine 324 may ingest the SQL command 330 and retrieve the first query result 352, which is held within a memory (not shown) of the software application 320.

Figure 3D:
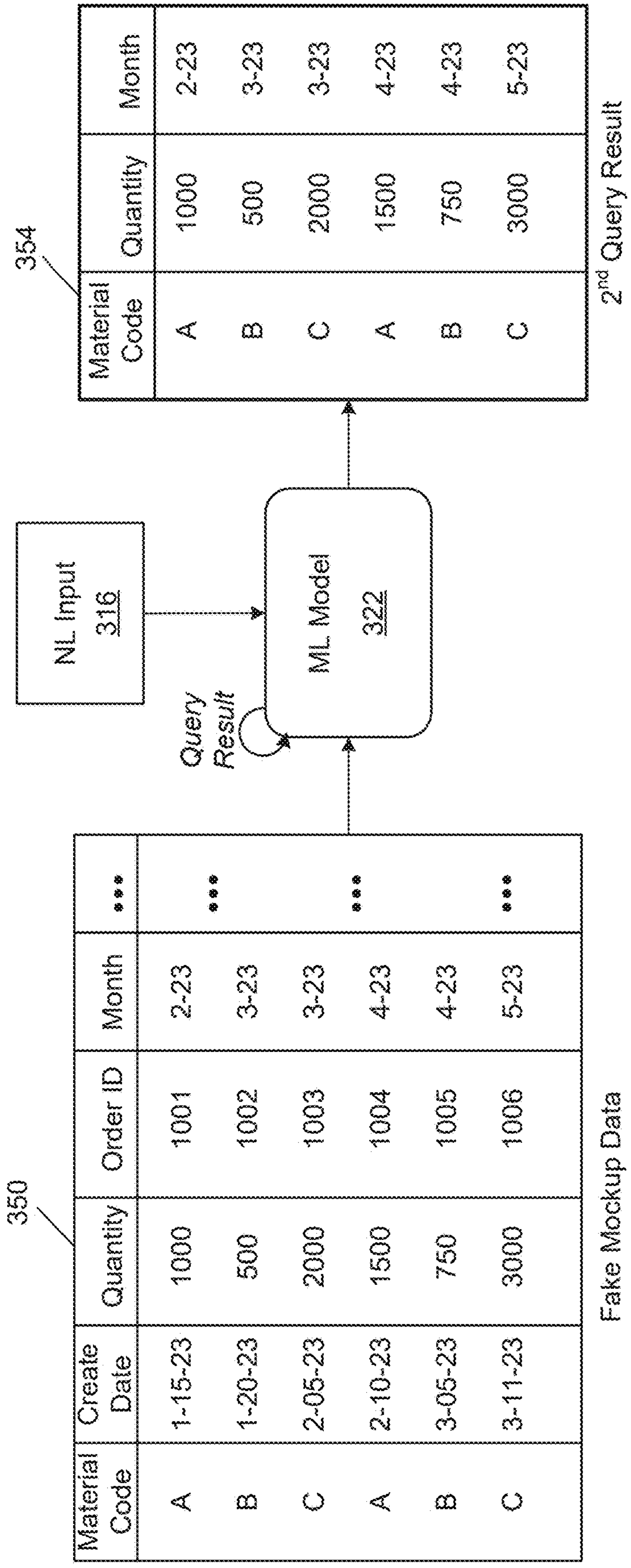
FIG. 3D is a diagram illustrating a process of querying the fake mockup data with the generative ML model to generate a second query result according to the examples and features of the instant solution.

FIG. 3D illustrates a process 300D of querying the fake mockup data 350 with the ML model 322 to generate a second query result 354 according to the examples and features of the instant solution. Referring to FIG. 3D, rather than rely on the SQL command 330, the ML model 322 may query the fake mockup data 350 directly using the natural language input 316 and the fake mockup data 350. For example, the software application 320 may generate a prompt that includes the natural language input 316 and the fake mockup data 350, and input the prompt to the ML model 322. In response, the ML model 322 may generate the second query result 354 from the fake mockup data 350.

Figure 3E:
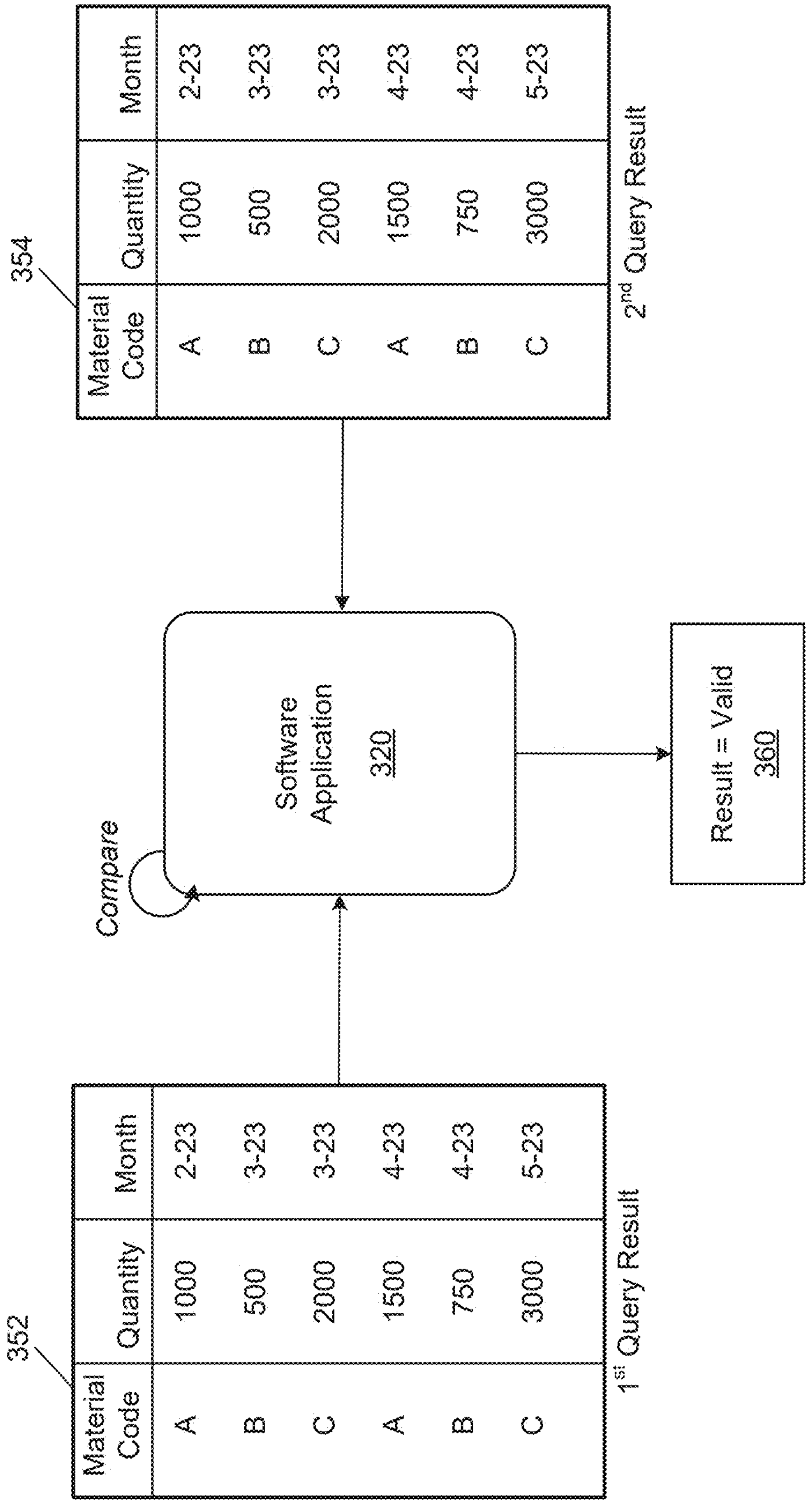
FIG. 3E is a diagram illustrating a process of verifying the SQL command based on the first and second query results according to the examples and features of the instant solution.

FIG. 3E illustrates a process 300E of verifying the SQL command based on the first and the second query results according to the examples and features of the instant solution. In the example embodiments, the second query result 354 generated by the ML model 322 may be considered/assumed to be accurate. Therefore, the second query result 354 can be used to validate the accuracy of the first query result 352 generated by execution of the SQL command 330. In this case, the software application 320 may compare the first query result 352 to the second query result to determine whether the SQL command 330 is accurate.

For example, if the first query result 352 includes all the content in the second query result 354, the first query result 352 may be considered accurate, and likewise, the SQL command 330 may be considered accurate. This includes a situation where the first query result 352 includes extra/additional data than what is included in the second query result 354. The first query result 352 includes the content of the second query result 354; the first query result 352 is considered accurate even if it has additional content not included in the second query result 354. In the example of FIG. 3E, the first query result 352 is the same (or identical) as the second query result 354 and is therefore considered accurate. Here, the software application 320 may determine a result 360 of the SQL command 330 as valid.

Figure 3F:
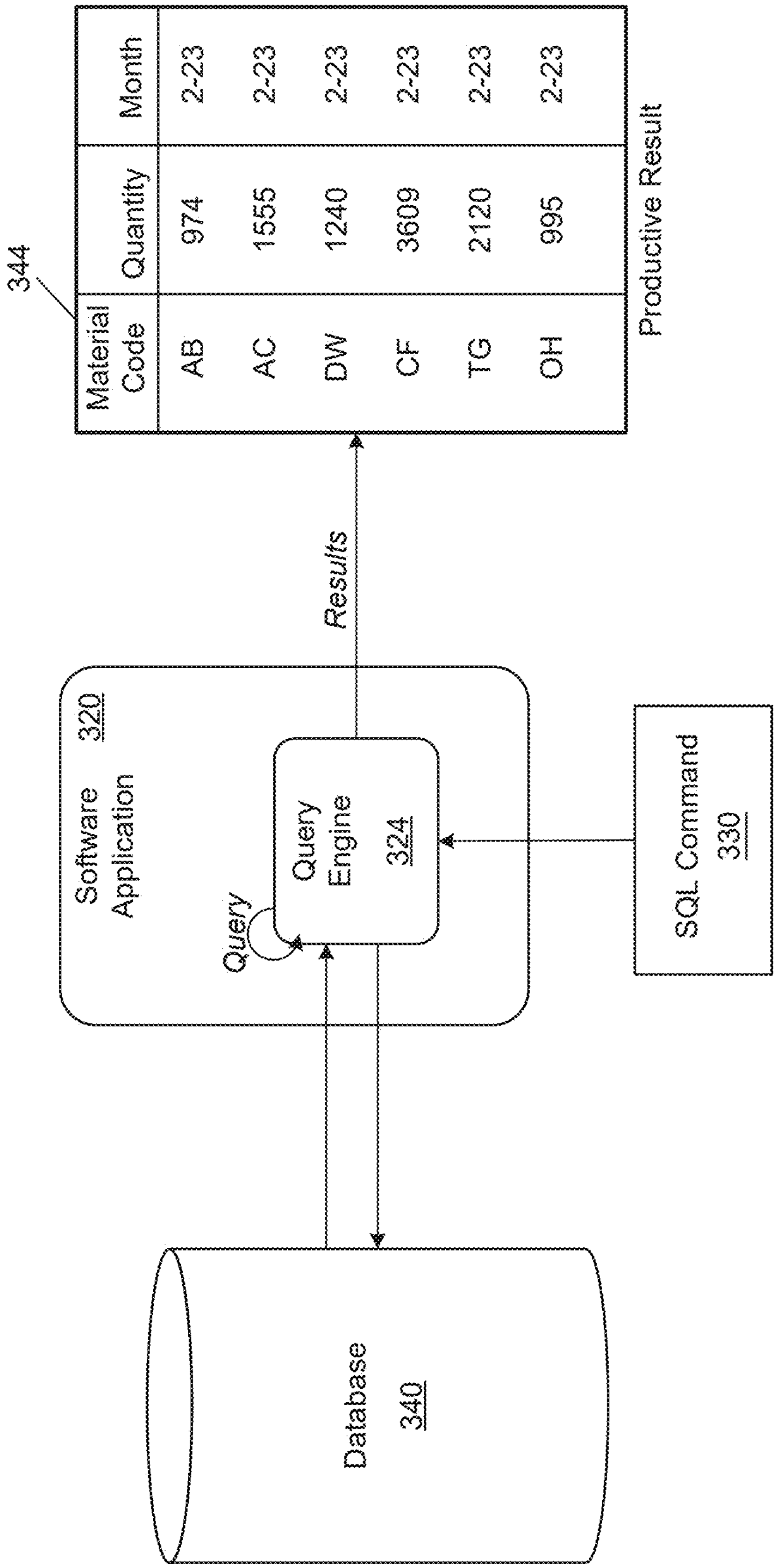
FIG. 3F is a diagram illustrating a process of executing the verified SQL command on productive data according to the examples and features of the instant solution.

FIG. 3F illustrates a process 300F of executing the verified SQL command on productive data according to the examples and features of the instant solution. Referring to FIG. 3F, when the software application 320 determines that the SQL command 330 is valid (or accurate), the software application 320 may initiate the query engine 324 to execute the SQL command 330 on live data (or productive data) within the database 340. In response, the query engine 324 may generate a productive result 344 of the SQL command 330. The productive result 344 may be provided to another software application as an output. As another example, the productive result 344 may be displayed on a GUI or the like.

FIGS. 4A-4C illustrates different examples of verification results according to the examples and features of the instant solution. For example, FIG. 4A illustrates a first case 400 in which the first query result (generated by execution of an SQL command on fake mockup data) and the second query result (generated by execution of an ML model on the fake mockup data) are the equivalent. This example is considered a successful verification because all the contents of the second query result are included in the first query result.

FIG. 4B illustrates a second case 410 in which the first query result (generated by execution of an SQL command on fake mockup data) and the second query result (generated by execution of an ML model on the fake mockup data) are not equivalent, but the first query result includes all of the content of the second query result. This example is also considered a successful verification because the entire content of the second query result is included in the first query result, even though the first query result includes additional content.

FIG. 4C illustrates a third case, 420, in which the first query result (generated by execution of an SQL command on fake mockup data) and the second query result (generated by execution of an ML model on the fake mockup data) are not equivalent, and the first query result does not include all of the content of the second query result. This example is considered a failure because the entire content of the second query result is not included in the first query result. In this example, the SQL command is considered inaccurate and may not be used, and the software application may ask the user for a new natural language input.

While the example instant solution shown utilizes a machine learning model such as a neural network, other branches of AI, such as, but not limited to, computer vision, fuzzy logic, expert systems, deep learning, generative AI, and natural language processing, may be employed in developing the machine learning model in this instant solution. Further, the machine learning model included in these examples and features of the instant solution is not limited to particular AI algorithms. Any algorithm or combination of algorithms related to supervised, unsupervised, and reinforcement learning may be employed.

The AI models, ML models, neural networks, and other branches of AI described and/or depicted herein build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate and predict data, and the like while inheriting all the capabilities of reactive machines.

Examples of AI models classified as limited memory machines include, but are not limited to, chatbots, virtual assistants, machine learning, neural networks, deep learning, natural language processing, generative AI models, and any future AI models that are yet to be developed possessing characteristics of limited memory machines.

For example, a neural network is a machine learning model that relies on training data to learn associations and connections, improving its accuracy for performing high-speed data classifications, clustering, and other data analyses. Such neural network capabilities are the foundation of deep learning models today and are becoming the foundational blocks of those yet to be developed.

For example, generative AI models combine limited memory machine technologies, incorporating machine learning and deep learning, forming the foundational building blocks of future AI models. For example, the theory of mind is the next progression of AI that may be able to perceive, connect, and react by generating appropriate reactions in response to an entity with which the AI model is interacting; all these theories of mind capabilities rely on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals learning from experiences to generate and draw conclusions about itself and its surroundings.

AI models may include, but are not limited to, at least one machine learning model, neural network model, deep learning model, generative AI model, or any combination of models from the branches of AI. AI models are integral to future artificial intelligence models. As described herein, AI model refers to present-day AI models and future AI models.

Artificial intelligence systems have been built and trained to perform various tasks in an automated manner. For example, artificial intelligence systems receive and understand verbal and/or written dialogue and function as digital assistants, speech-to-text programs, etc. Other artificial intelligence systems are trained on different types of information to allow the trained system to generate content-such as new works of art based on the styles seen or new compound ideas based on the history of chemical research.

Foundation models are artificial intelligence systems trained on a broad set of unlabeled data that can be used for different tasks with minimal fine-tuning. The unlabeled data includes, in some instances, imagery and/or language. In response to a short prompt input into the foundation model, the system generates an output, such as an entire essay or a complex image, based on the parameters outlined in the input prompt. The foundation model can produce an output that attempts to meet the parameters even if the foundation model was never trained with specific training data that included the exact parameters, e.g., was never trained for that exact argument or to generate an image in that way.

Using self-supervised learning and transfer learning, foundation models can apply the information they have learned about one situation to another. For example, a human learns how to drive one car and, without too much effort, could learn how to drive other vehicles such as cars, trucks, or buses. The foundation model is similarly used to achieve proficiency in some new areas without being trained completely from scratch. Foundation models seem to have inherent creativity in tasks such as stringing together coherent arguments or creating original art pieces. Foundation models are established in the technology of natural language processing. One example of how foundation models are helpful is that for previous generations of AI techniques if you wanted to build an AI model that could summarize bodies of text for you, you would need tens of thousands of labeled examples just for the summarization use case. With a pre-trained foundation model, the labeled data requirements are dramatically reduced. First, the foundation model is fine-tuned with a domain-specific unlabeled corpus to create a domain-specific foundation model. Then, a foundation model is trained for summarization using a much smaller amount of labeled data, potentially just a thousand labeled examples. The domain-specific foundation model can be used for many tasks instead of the previous technologies that required building models from scratch in each use case. Foundation models are even applicable in computer programming, coding analysis, generation, and repair.

Some foundation models are used for sentiment analysis. With pre-trained foundation models, sentiment analysis on a new language can be trained using as little as a few thousand sentences—100 times fewer annotations are required than in previous models. Reducing labeling requirements will make implementation much easier in various technical areas. Systems that execute specific tasks in a single domain give way to broad AI that learns more generally and works across domains and problems. Foundation models, trained on large, unlabeled datasets and fine-tuned for various applications, drive this shift.

Large language models (LLMs) are foundation models trained on immense amounts of data, making them capable of understanding and generating natural language and other types of content to perform various tasks. LLMs have been implemented at different levels to enhance their natural language understanding (NLU) and natural language processing (NLP) capabilities. This advancement of LLMs has occurred alongside advances in machine learning, machine learning models, algorithms, neural networks, and the transformer models that provide the architecture for these AI systems.

LLMs are foundation models trained on enormous amounts of data to provide the foundational capabilities to drive multiple use cases and applications and resolve many tasks. This LLM concept starkly contrasts the idea of building and training domain-specific models for each use case individually, which is prohibitive under many criteria (most importantly cost and infrastructure), stifles synergies, and can even lead to inferior performance.

LLMs represent a significant breakthrough in NLP and artificial intelligence. LLMs are accessible through interfaces like Open AI's Chat GPT-3 and GPT-4, which have garnered Microsoft's support. Other examples include Meta's Llama models and Google's bidirectional encoder representations from transformers (BERT/RoBERTa) and PaLM models. IBM has also recently launched its Granite model series on watsonx.ai, which has become the generative AI backbone for other IBM products like watsonx Assistant and watsonx Orchestrate.

In a nutshell, LLMs are designed to understand and generate text like humans and other forms of content based on the vast amount of data used to train them. They can infer from context, generate coherent and contextually relevant responses, translate to languages other than English, summarize text, answer questions (general conversation and FAQs), and even assist in creative writing or code generation tasks. LLMs can do some or all of these tasks thanks to many, e.g., billions of parameters that enable them to capture intricate patterns in language and perform a wide array of language-related tasks. LLMs are revolutionizing applications in various fields, from chatbots and virtual assistants to content generation, research assistance, and language translation.

LLMs operate by leveraging deep learning techniques and vast amounts of textual data. These models are typically based on a transformer architecture, like the generative pre-trained transformer, which excels at handling sequential data like text input. LLMs consist of multiple layers of neural networks, each with parameters that can be fine-tuned during training, which are enhanced further by numerous layers known as the attention mechanism, which dials in on specific parts of data sets.

Figure 5A:
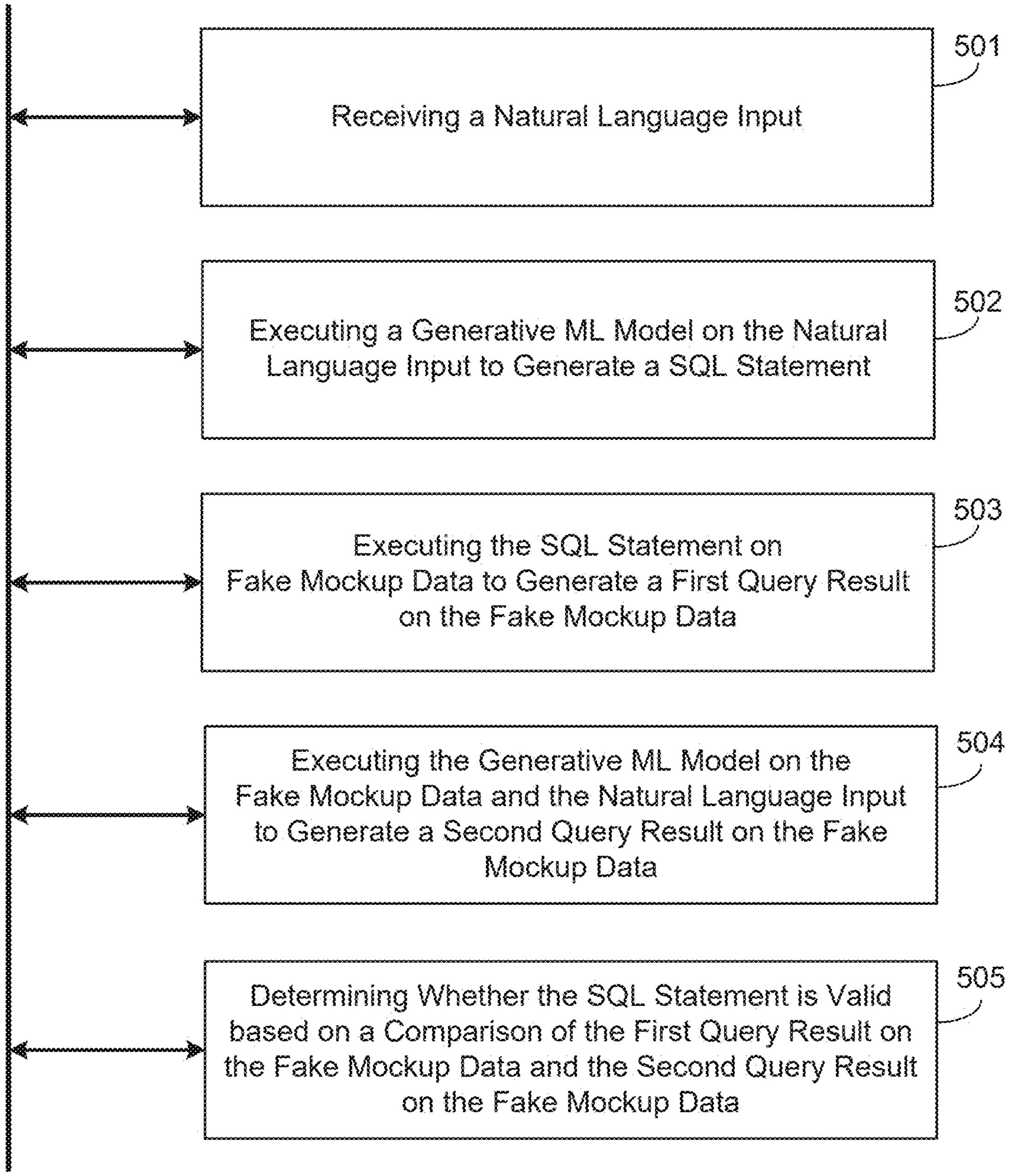
FIG. 5A is a diagram illustrating a flow diagram, according to example embodiments.

FIG. 5A illustrates a flow diagram of a method 500, according to example embodiments. Referring to FIG. 5A, in 501, the method may include receiving a natural language input. 502, the method may include executing a generative machine learning (ML) model on the natural language input to generate a structured query language (SQL) statement. In 503, the method may include executing the SQL statement on fake mockup data to generate a first query result on the fake mockup data. In 504, the method may include executing the generative ML model on the natural language input and the fake mockup data to generate a second query result on the fake mockup data. In 505, the method may include determining whether the SQL statement is valid based on a comparison of the first query result and the second query result.

FIG. 5B illustrates a flow diagram of a method 510, according to example embodiments. Referring to FIG. 5B, in 511, the method may include determining that the SQL statement is valid when content included in the first query result includes all content in the second query result. In 512, the method may include determining that the SQL statement is invalid when content included in the first query result does not include all content included in the second query result. In 513, the method may include executing the SQL statement on productive data stored within a database to generate a productive query result and outputting the productive query result to a software application in response to a determination that the SQL statement is valid.

In 514, the fake mockup data may include tabular data, and the method may include executing the generative ML model on a schema of a database and a data type associated with the SQL statement to generate the fake mockup data, prior to execution of the SQL statement on the fake mockup data. In 515, the method may include simultaneously executing the SQL statement on the fake mockup data to generate the first query result on the fake mockup data and executing the generative ML model on the natural language input and the fake mockup data to generate the second query result on the fake mockup data. In 516, the first query result may include a first subset of tabular data extracted from the fake mockup data and the second query result may include a second subset of tabular data extracted from the fake mockup data, and the method may include validating the SQL statement based on a comparison of the first subset of tabular data to the second subset of tabular data.

The above embodiments may be implemented in hardware, a computer program executed by a processor, firmware, or a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor so that the processor may read and write information to it. In the alternative, the storage medium may be integral to the processor. The processor and the storage medium may reside in an application-specific integrated circuit ("ASIC"). In the alternative, the processor and the storage medium may reside as discrete components.

What is claimed is:

1. An apparatus comprising:

a memory; and at least one processor, communicatively coupled to the memory, the at least one processor configured to:
  receive a natural language input;
  execute a generative machine learning (ML) model on the natural language input to generate a structured query language (SQL) statement;

generate, by the generative ML model, fake mockup data by inputting a prompt to the ML model, wherein the prompt includes a table schema of a database that stores productive data, a data type of data associated with the SQL statement, an explanation of the data, a data format of the data, an indication of a quantity of rows to be included in the fake mockup data, and an indication of a quantity of columns to be included in the fake mockup data;

execute the SQL statement on the fake mockup data to generate a first query result comprising a first subset of data of the fake mockup data;

execute the generative ML model on the natural language input and the fake mockup data to generate a second query result comprising a second subset of data of the fake mockup data;

determine whether the SQL statement is valid by determining whether the first subset of data includes all content in the second subset of data; and execute the SQL statement on the productive data stored within the database to generate a productive query result.

2. The apparatus of claim 1, wherein the at least one processor is configured to determine that the SQL statement is valid when content included in the first query result includes all content included in the second query result.

3. The apparatus of claim 1, wherein the at least one processor is configured to determine that the SQL statement is invalid when content included in the first query result does not include all content included in the second query result.

4. The apparatus of claim 1, wherein the at least one processor is configured to output the productive query result to a software application, in response to a determination that the SQL statement is valid.

5. The apparatus of claim 1, wherein the at least one processor is configured to simultaneously execute the SQL statement on the fake mockup data to generate the first query result on the fake mockup data and execute the generative ML model on the natural language input and the fake mockup data to generate the second query result on the fake mockup data.

6. The apparatus of claim 1, wherein the first query result comprises a first subset of tabular data extracted from the fake mockup data and the second query result comprises a second subset of tabular data extracted from the fake mockup data, wherein the at least one processor is configured to validate the SQL statement based on a comparison of the first subset of tabular data to the second subset of tabular data.

7. The apparatus of claim 1, wherein a size of the fake mockup data is less than a size of the database.

8. A method comprising:

receiving a natural language input;

executing a generative machine learning (ML) model on the natural language input to generate a structured query language (SQL) statement;

generating, by the generative ML model, fake mockup data by inputting a prompt to the ML model, wherein the prompt includes a table schema of a database that stores productive data, a data type of data associated with the SQL statement, an explanation of the data, a data format of the data, an indication of a quantity of rows to be included in the fake mockup data, and an indication of a quantity of columns to be included in the fake mockup data;

executing the SQL statement on the fake mockup data to generate a first query result comprising a first subset of data of the fake mockup data;

executing the generative ML model on the natural language input and the fake mockup data to generate a second query result comprising a second subset of data of the fake mockup data;

determining whether the SQL statement is valid by determining whether the first subset of data includes all content in the second subset of data; and executing the SQL statement on the productive data stored within the database to generate a productive query result.

9. The method of claim 8, wherein the determining comprises determining that the SQL statement is valid when content included in the first query result includes all content included in the second query result.

10. The method of claim 8, wherein the determining comprises determining that the SQL statement is invalid when content included in the first query result does not include all content included in the second query result.

11. The method of claim 8, comprising outputting the productive query result to a software application, in response to a determination that the SQL statement is valid.

12. The method of claim 8, wherein the executing the SQL statement comprises simultaneously executing the SQL statement on the fake mockup data to generate the first query result on the fake mockup data and executing the generative ML model on the natural language input and the fake mockup data to generate the second query result on the fake mockup data.

13. The method of claim 8, wherein the first query result comprises a first subset of tabular data extracted from the fake mockup data and the second query result comprises a second subset of tabular data extracted from the fake mockup data, and the determining comprises validating the SQL statement based on a comparison of the first subset of tabular data to the second subset of tabular data.

14. The method of claim 8, wherein a size of the fake mockup data is less than a size of the database.

15. A computer-readable storage medium comprising instructions which when executed by a processor cause the processor to perform:

receiving a natural language input;

executing a generative machine learning (ML) model on the natural language input to generate a structured query language (SQL) statement;

generating, by the generative ML model, fake mockup data by inputting a prompt to the ML model, wherein the prompt includes a table schema of a database that stores productive data, a data type of data associated with the SQL statement, an explanation of the data, a data format of the data, an indication of a quantity of rows to be included in the fake mockup data, and an indication of a quantity of columns to be included in the fake mockup data;

executing the SQL statement on the fake mockup data to generate a first query result comprising a first subset of data of the fake mockup data;

executing the generative ML model on the natural language input and the fake mockup data to generate a second query result comprising a second subset of data of the fake mockup data;

determining whether the SQL statement is valid by determining whether the first subset of data includes all content in the second subset of data; and executing the SQL statement on the productive data stored within the database to generate a productive query result.

16. The computer-readable storage medium of claim 15, wherein the determining comprises determining that the SQL statement is valid when content included in the first query result includes all content included in the second query result.

17. The computer-readable storage medium of claim 15, wherein the determining comprises determining that the SQL statement is invalid when content included in the first query result does not include all content included in the second query result.

18. The computer-readable storage medium of claim 15, wherein the processor is configured to perform outputting the productive query result to a software application, in response to a determination that the SQL statement is valid.

19. The computer-readable storage medium of claim 15, wherein the executing the SQL statement comprises simultaneously executing the SQL statement on the fake mockup data to generate the first query result on the fake mockup data and executing the generative ML model on the natural language input and the fake mockup data to generate the second query result on the fake mockup data.

20. The computer-readable storage medium of claim 15, wherein a size of the fake mockup data is less than a size of the database.

* * * * *